(12) United States Patent
Abedini et al.

(10) Patent No.: US 12,712,625 B2
(45) Date of Patent: Aug. 18, 2026

(54) LATENCY CAPABILITY INDICATION FOR NETWORK-CONTROLLED REPEATER

(71) Applicant: QUALCOMM Incorporated, San Diego, CA (US)

(72) Inventors: Navid Abedini, Basking Ridge, NJ (US); Junyi Li, Fairless Hills, PA (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/481,947

(22) Filed: Oct. 5, 2023

(65) Prior Publication Data

US 2024/0154687 A1 May 9, 2024

Related U.S. Application Data

(60) Provisional application No. 63/382,409, filed on Nov. 4, 2022.

(51) Int. Cl.
*H04B 7/155* (2006.01)
*H04W 52/02* (2009.01)

(52) U.S. Cl.
CPC ..... *H04B 7/15557* (2013.01); *H04B 7/15528* (2013.01); *H04W 52/0203* (2013.01)

(58) Field of Classification Search
CPC ........... H04B 7/15557; H04B 7/15528; H04W 52/0203
See application file for complete search history.

(56) References Cited

U.S. PATENT DOCUMENTS 11,671,168 B2 * 6/2023 Tekgul .................. H04W 40/12 370/315
11,824,620 B2 * 11/2023 Tekgul .................. H04W 24/02
2010/0035541 A1 * 2/2010 Kim ..................... H04B 7/2606 455/9
2012/0026996 A1 * 2/2012 Yamaguchi ............ H04B 1/406 370/338
2019/0288743 A1 * 9/2019 Wang ...................... H04L 25/24
2021/0075497 A1 * 3/2021 Tekgul .................... H04W 8/22
2021/0194569 A1 * 6/2021 Ray Chaudhuri . H04B 7/15507
2021/0203406 A1 * 7/2021 Tekgul .................. H04W 24/02

(Continued)

OTHER PUBLICATIONS

Interdigital Inc: “Discussions on Side Control Information for NR Network-Controlled Repeaters”, 3GPP TSG RAN WG1 #110bis-e, R1-2208684, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 11 Pages, XP052276607, p. 2, paragraphs 2.1.3, 2.2.

(Continued)

*Primary Examiner* — Fayyaz Alam
(74) *Attorney, Agent, or Firm* — Harrity & Harrity, LLP

(57) ABSTRACT

Various aspects of the present disclosure generally relate to wireless communication. In some aspects, a network-controlled repeater (NCR) may transmit an indication of a latency capability of the NCR for switching between repeater modes for mobile termination and for forwarding. The NCR may communicate based at least in part on the latency capability. Numerous other aspects are described.

18 Claims, 12 Drawing Sheets

(56) References Cited

U.S. PATENT DOCUMENTS

2021/0204098 A1* 7/2021 Raghavan .......... H04B 7/15557
2022/0045746 A1 2/2022 Abedini et al.

OTHER PUBLICATIONS

International Search Report and Written Opinion—PCT/US2023/076229—ISA/EPO—Jun. 14, 2024.
Partial International Search Report—PCT/US2023/076229—ISA/EPO—Feb. 12, 2024.
European Search Report—EP25226623—Search Authority—Munich—Mar. 17, 2026.
ZTE: "Discussion on Side Control Information for NCR", 3GPP TSG RAN WG1 #110, R1-2206018, Toulouse, France, Aug. 22-26, 2022, Aug. 12, 2022, 13 Pages, XP052273951.

* cited by examiner

300
Service Management and Orchestration (SMO) Framework
Non-Real Time RAN Intelligent Controller (RIC)
305
315
Core Network
320
Backhaul link
O1
O2
A1
E2
Near-Real Time RAN Intelligent Controller (RIC)
325
O-eNB
311
CU
310
O-Cloud
390
Midhaul link
Fronthaul link
DU
330
RU
340
UE
120
Access link

700

800

1000

LATENCY CAPABILITY INDICATION FOR NETWORK-CONTROLLED REPEATER

CROSS-REFERENCE TO RELATED APPLICATION

This patent application claims priority to U.S. Provisional Patent Application No. 63/382,409, filed on Nov. 4, 2022, entitled "LATENCY CAPABILITY INDICATION FOR NETWORK-CONTROLLED REPEATER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for providing a latency capability indication for a network-controlled repeater.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network-controlled repeater (NCR). The method may include transmitting an indication of a latency capability of the NCR for switching between repeater modes for mobile termination and for forwarding. The method may include communicating based at least in part on the latency capability.

Some aspects described herein relate to a method of wireless communication performed by an NCR. The method may include transmitting an indication of a sleep mode capability for using sleep modes that are associated with repeater modes. The method may include switching from a first repeater mode to a second repeater mode based at least in part on one or more of a first sleep mode associated with the first repeater mode or a second sleep mode associated with the second repeater mode.

Some aspects described herein relate to a method of wireless communication performed by a network entity. The method may include receiving an indication of a latency capability of an NCR for switching between repeater modes for mobile termination and for forwarding. The method may include communicating based at least in part on the latency capability.

Some aspects described herein relate to a method of wireless communication performed by an NCR. The method may include receiving an indication of a sleep mode capability for using sleep modes that are associated with repeater modes. The method may include communicating based at least in part on one or more of a first sleep mode associated with a first repeater mode or a second sleep mode associated with a second repeater mode.

Some aspects described herein relate to an NCR for wireless communication. The NCR may include memory, one or more processors coupled to the memory, and instructions stored in the memory and executable by the one or more processors. The instructions may be executable by the one or more processors to cause the NCR to transmit an indication of a latency capability of the NCR for switching between repeater modes for mobile termination and for forwarding. The instructions may be executable by the one or more processors to cause the NCR to communicate based at least in part on the latency capability.

Some aspects described herein relate to an NCR for wireless communication. The NCR may include memory, one or more processors coupled to the memory, and instructions stored in the memory and executable by the one or more processors. The instructions may be executable by the one or more processors to cause the NCR to transmit an indication of a sleep mode capability for using sleep modes that are associated with repeater modes. The instructions may be executable by the one or more processors to cause the NCR to switch from a first repeater mode to a second repeater mode based at least in part on one or more of a first sleep mode associated with the first repeater mode or a second sleep mode associated with the second repeater mode.

Some aspects described herein relate to a network entity for wireless communication. The network entity may include memory, one or more processors coupled to the memory, and instructions stored in the memory and executable by the one or more processors. The instructions may be executable by the one or more processors to cause the network entity to receive an indication of a latency capability of an NCR for switching between repeater modes for mobile termination and for forwarding. The instructions may be executable by the one or more processors to cause the network entity to communicate based at least in part on the latency capability.

Some aspects described herein relate to an NCR for wireless communication. The NCR may include memory, one or more processors coupled to the memory, and instructions stored in the memory and executable by the one or more processors. The instructions may be executable by the one or more processors to cause the NCR to receive an indication of a sleep mode capability for using sleep modes that are associated with repeater modes. The instructions may be executable by the one or more processors to cause the NCR to communicate based at least in part on one or more of a first sleep mode associated with a first repeater mode or a second sleep mode associated with a second repeater mode.

Some aspects described herein relate to a non-transitory computer-readable medium that stores one or more instructions for wireless communication by an NCR. The one or more instructions, when executed by one or more processors of the NCR, may cause the NCR to transmit an indication of a latency capability of the NCR for switching between repeater modes for mobile termination and for forwarding. The one or more instructions, when executed by one or more processors of the NCR, may cause the NCR to communicate based at least in part on the latency capability.

Some aspects described herein relate to a non-transitory computer-readable medium that stores one or more instructions for wireless communication by a non-transitory computer-readable medium storing one or more instructions for wireless communication. The one or more instructions, when executed by one or more processors of the NCR, may cause the NCR to transmit an indication of a sleep mode capability for using sleep modes that are associated with repeater modes. The one or more instructions, when executed by one or more processors of the NCR, may cause the NCR to switch from a first repeater mode to a second repeater mode based at least in part on one or more of a first sleep mode associated with the first repeater mode or a second sleep mode associated with the second repeater mode.

Some aspects described herein relate to a non-transitory computer-readable medium that stores one or more instructions for wireless communication by a network entity. The one or more instructions, when executed by one or more processors of the network entity, may cause the network entity to receive an indication of a latency capability of an NCR for switching between repeater modes for mobile termination and for forwarding. The one or more instructions, when executed by one or more processors of the network entity, may cause the network entity to communicate based at least in part on the latency capability.

Some aspects described herein relate to a non-transitory computer-readable medium that stores one or more instructions for wireless communication by an NCR. The one or more instructions, when executed by one or more processors of the NCR, may cause the NCR to receive an indication of a sleep mode capability for using sleep modes that are associated with repeater modes. The one or more instructions, when executed by one or more processors of the NCR, may cause the NCR to communicate based at least in part on one or more of a first sleep mode associated with a first repeater mode or a second sleep mode associated with a second repeater mode.

Some aspects described herein relate to an apparatus for wireless communication. The apparatus may include means for transmitting an indication of a latency capability of the apparatus for switching between repeater modes for mobile termination and for forwarding. The apparatus may include means for communicating based at least in part on the latency capability.

Some aspects described herein relate to an apparatus for wireless communication. The apparatus may include means for transmitting an indication of a sleep mode capability for using sleep modes that are associated with repeater modes. The apparatus may include means for switching from a first repeater mode to a second repeater mode based at least in part on one or more of a first sleep mode associated with the first repeater mode or a second sleep mode associated with the second repeater mode.

Some aspects described herein relate to an apparatus for wireless communication. The apparatus may include means for receiving an indication of a latency capability of an NCR for switching between repeater modes for mobile termination and for forwarding. The apparatus may include means for communicating based at least in part on the latency capability.

Some aspects described herein relate to an apparatus for wireless communication. The apparatus may include means for receiving an indication of a sleep mode capability for using sleep modes that are associated with repeater modes. The apparatus may include means for communicating based at least in part on one or more of a first sleep mode associated with a first repeater mode or a second sleep mode associated with a second repeater mode.

Aspects generally include a method, apparatus, system, computer program product, non-transitory computer-readable medium, user equipment, mobile station, base station, NCR, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
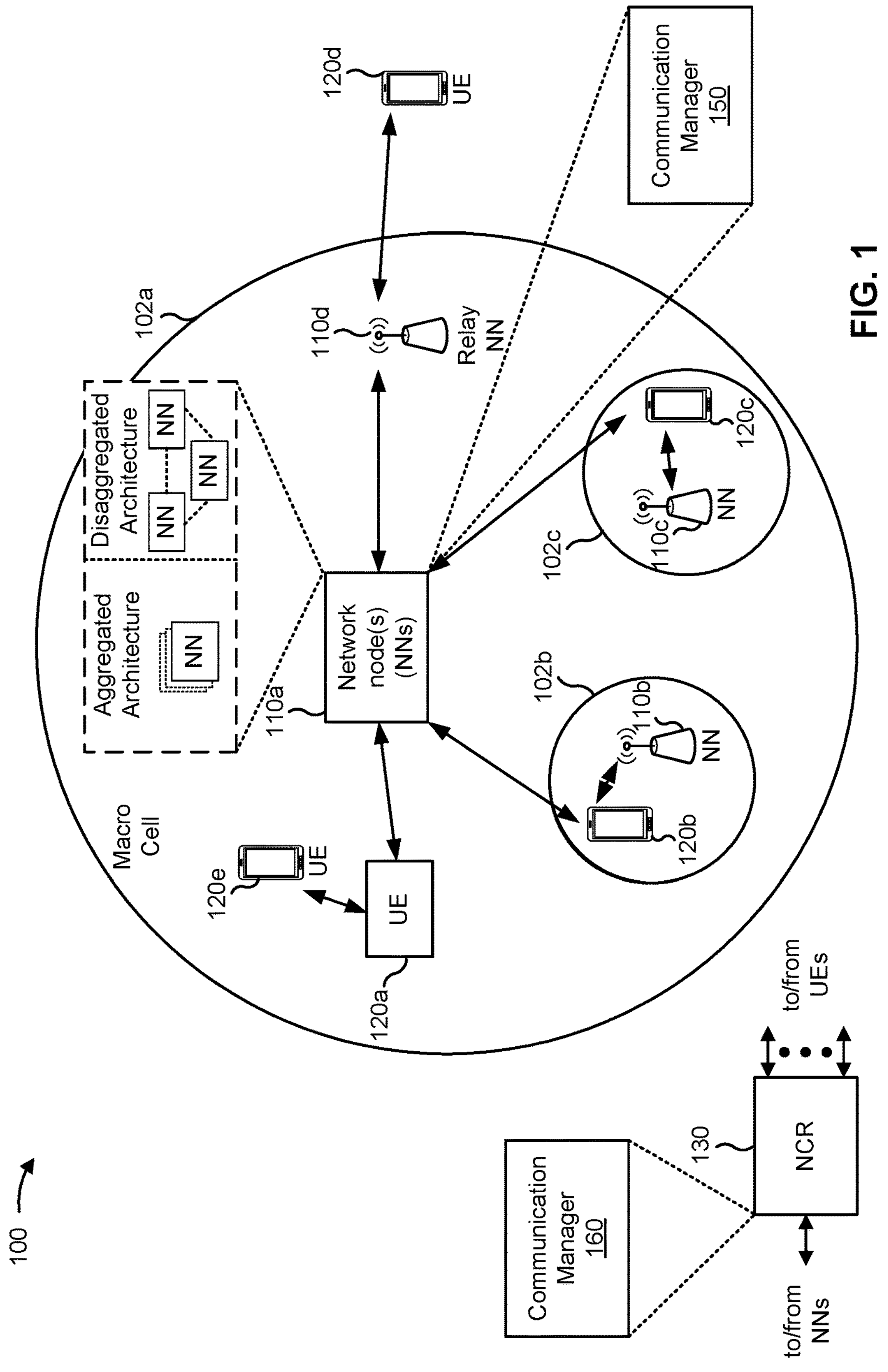
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmit receive point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station," "network node," or "network entity" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station," "network node," or "network entity" may refer to one device configured to perform one or more functions, such as those described herein in connection with the network node 110. In some aspects, the terms "base station," "network node," or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station," "network node," or "network entity" may refer to any one or more of those different devices. In some aspects, the terms "base station," "network node," or "network entity" may refer to one or more virtual base stations or one or more virtual base station functions. For example, in some aspects, two or more base station functions may be instantiated on a single device. In some aspects, the terms "base station," "network node," or "network entity" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller may couple to or communicate with a set of network nodes 110 and may provide coordination and control for these network nodes 110. The network controller may communicate with the network nodes 110 via a backhaul communication link or a midhaul communication link. The network nodes 110 may communicate with one another directly or indirectly via a wireless or wireline backhaul communication link. In some aspects, the network controller may be a CU or a core network device, or may include a CU or a core network device.

A network-controlled repeater (NCR) 130 may be a network entity that is coupled to or communicates with one or more network entities (e.g., network node 110) and one or more UEs (e.g., UE 120). The NCR 130 may have a mobile termination (MT) function for communications. The network entity may control the operation of the NCR 130 via a control link. The NCR 130 may also have a forwarding (Fwd) function for forwarding communications between network entities (via a backhaul link) and UEs (via an access link).

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, an NCR (e.g., NCR 130) may include a communication manager 160. As described in more detail elsewhere herein, the communication manager 160 may transmit an indication of a latency capability of the NCR for switching between repeater modes for mobile termination and for forwarding. The communication manager 160 may communicate based at least in part on the latency capability.

In some aspects, the communication manager 160 may transmit an indication of a sleep mode capability for using sleep modes that are associated with repeater modes. The communication manager 160 may switch from a first repeater mode to a second repeater mode based at least in part on one or more of a first sleep mode associated with the first repeater mode or a second sleep mode associated with the second repeater mode.

In some aspects, the communication manager 160 may receive an indication of a sleep mode capability for using sleep modes that are associated with repeater modes. The communication manager 160 may communicate based at least in part on one or more of a first sleep mode associated with a first repeater mode or a second sleep mode associated with a second repeater mode. Additionally, or alternatively, the communication manager 160 may perform one or more other operations described herein.

In some aspects, a network entity (e.g., network node 110) may include a communication manager 150. As described in more detail elsewhere herein, the communication manager 150 may receive an indication of a latency capability of an NCR for switching between repeater modes for mobile termination and for forwarding. The communication manager 150 may communicate based at least in part on the latency capability. Additionally, or alternatively, the communication manager 150 may perform one or more other operations described herein.

As indicated above, FIG. 1 is provided as an example. Other examples may differ from what is described with regard to FIG. 1.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "memory" or "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

Figure 2:
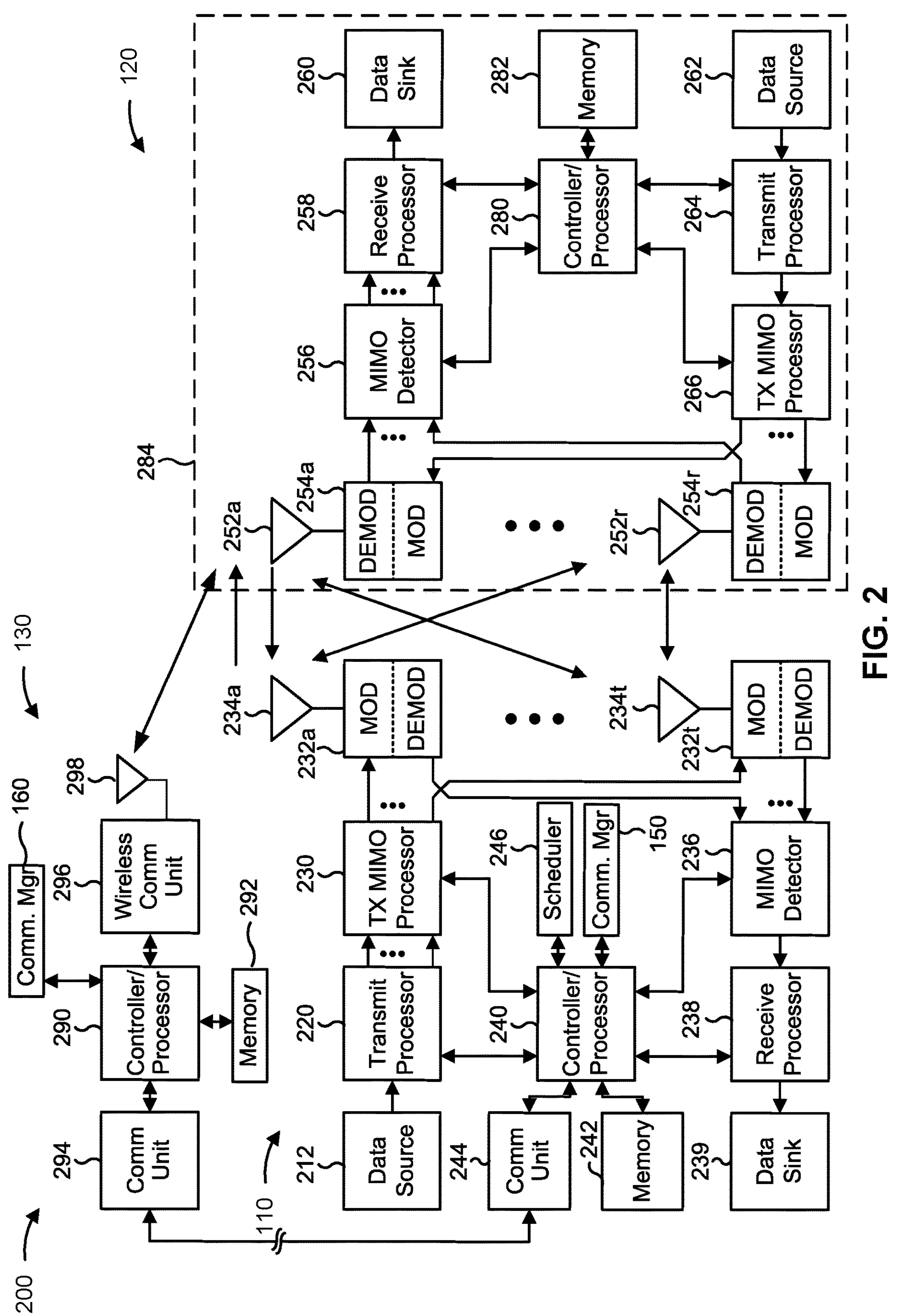
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCS s) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The NCR 130 may include a communication unit 294, a controller/processor 290, and a memory 292. The NCR 130 may communicate with the network node 110 and other network entities via the communication unit 294. The NCR 130 may also include components used for wireless communication with UEs and network entities. These components may include a wireless communication unit 296 and an antenna 298. The wireless communication unit 296 may include the components described for the network node 110, such as modems and transmit/receive processors.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor

280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-12).

The controller/processor of a network entity (e.g., controller/processor 290 of the NCR 130, controller/processor 240 of the network node 110) and/or any other component(s) of FIG. 2 may perform one or more techniques associated with indicating a latency capability and/or a sleep capability for NCR repeater modes, as described in more detail elsewhere herein. For example, the controller/processor 290 of the NCR 130, the controller/processor 240 of the network node 110, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 292 may store data and program codes for the network node 110 and the UE 120, respectively. In some examples, the memory 242 and/or the memory 292 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the NCR 130, may cause the one or more processors, the network node 110, and/or the NCR 130 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, an NCR (e.g., NCR 130) includes means for transmitting an indication of a latency capability of the NCR for switching between repeater modes for mobile termination and for forwarding; and/or means for communicating based at least in part on the latency capability. In some aspects, the means for the NCR to perform operations described herein may include, for example, one or more of communication manager 160, communication unit 294, controller/processor 290, memory 292, wireless communication unit 296, antenna 298, transmit processor 220, TX MIMO processor 230, modem 232, MIMO detector 236, and/or receive processor 238.

In some aspects, an NCR (e.g., NCR 130) includes means for transmitting an indication of a sleep mode capability for using sleep modes that are associated with repeater modes; and/or means for switching from a first repeater mode to a second repeater mode based at least in part on one or more of a first sleep mode associated with the first repeater mode or a second sleep mode associated with the second repeater mode.

In some aspects, an NCR (e.g., NCR 130) includes means for receiving an indication of a sleep mode capability for using sleep modes that are associated with repeater modes; and/or means for communicating based at least in part on one or more of a first sleep mode associated with a first repeater mode or a second sleep mode associated with a second repeater mode.

In some aspects, a network entity (e.g., network node 110) includes means for receiving an indication of a latency capability of an NCR for switching between repeater modes for mobile termination and for forwarding; and/or means for communicating based at least in part on the latency capability. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

"Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
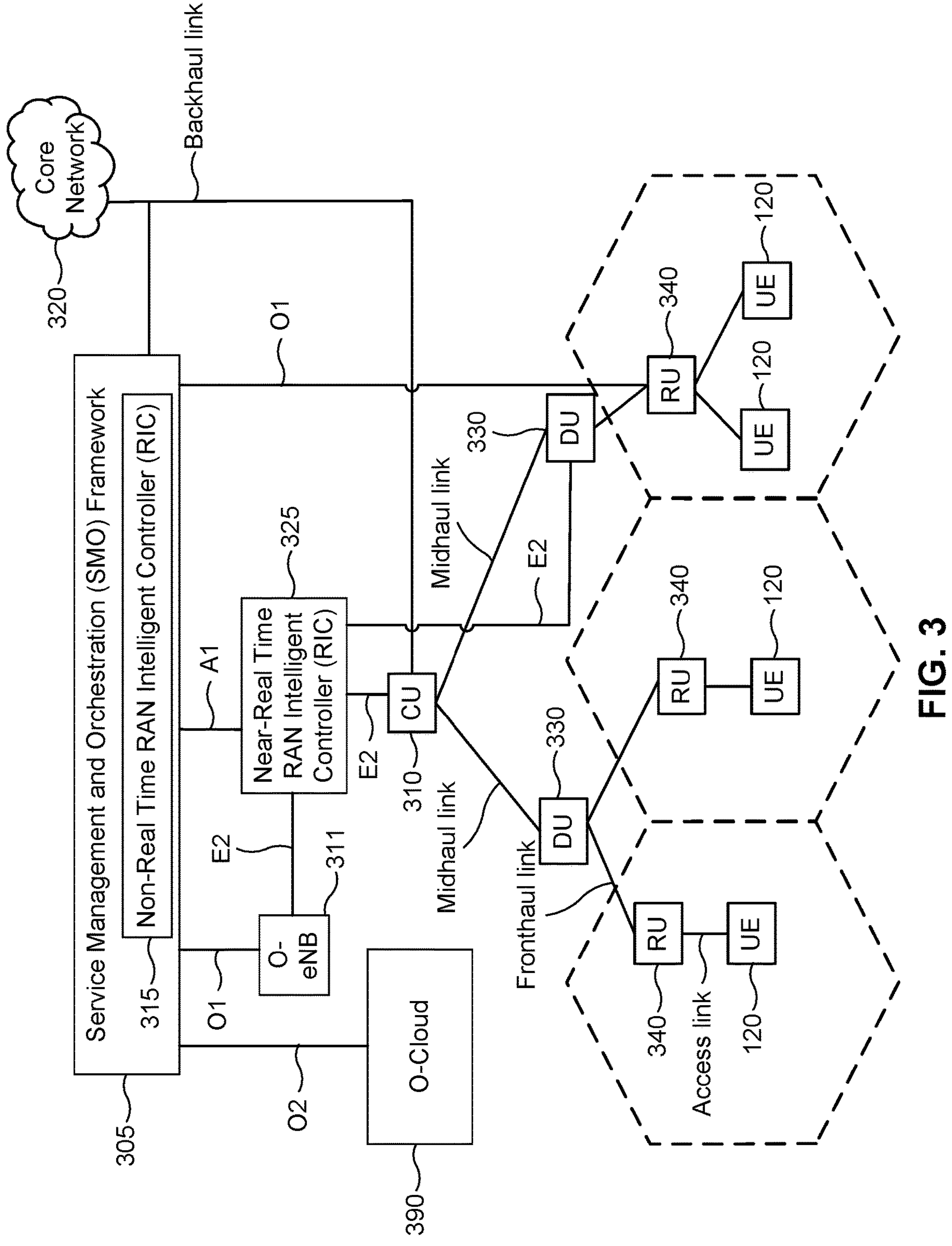
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325. In some examples, the near-RT RIC 325 may be a logical function that enables near-real-time control and optimization of O-RAN elements and resources via fine-grained data collection and actions over an E2 interface. The Near-RT RIC 325 may be collocated with the RAN or network entity to provide the real-time processing, such as online ML training or near real time ML inference. The non-RT RIC 315 may be a logical function that enables non-real-time control and optimization of RAN elements and resources, AI/ML workflow including model training and updates, and policy-based guidance of applications/features in near-RT RIC 325, as well as ML inference with less latency specification. The non-RT RIC 315 may be located further from the RAN or network node, such as on a cloud-based server or on an edge server.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
FIG. 4 is a diagram of an example of a network-controlled repeater (NCR), in accordance with the present disclosure.
Figure 4:
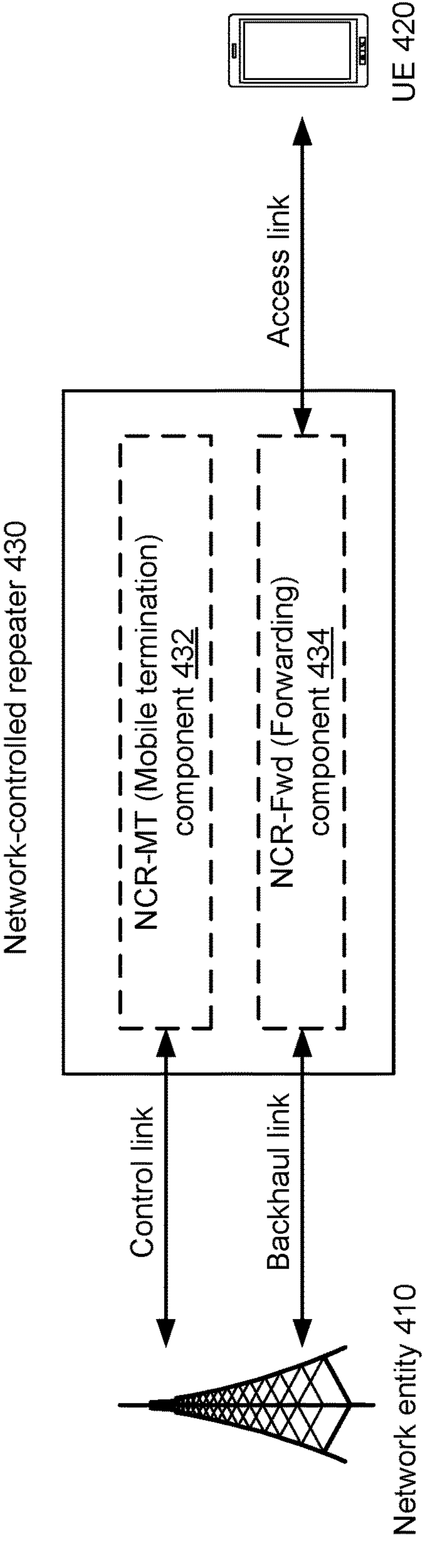

FIG. 4 is a diagram of an example 400 of an NCR (e.g., NCR 130), in accordance with the present disclosure. The NCR 430 may communicate with a network entity 410 (e.g., network node 110) and one or more UEs, such as UE 420, in a wireless communication network (e.g., wireless network 100 shown in FIG. 1). An NCR-MT component 432 of the NCR 430 may receive instructions on a control link for forwarding. An NCR-Fwd component 434 of the NCR 430 may forward communications for the network entity 410 to the UE 420 and from the UE 420 to the network entity 410. The NCR 430 may use a backhaul link to the network entity 410 and an access link to the UE 420.

In some aspects, at any given time, one, none, or both of the NCR-MT component 432 and the NCR-Fwd component 434 may be active. There may be multiple repeater modes. For example, in repeater mode 1, NCR-MT is ON and NCR-Fwd is ON. In repeater mode 2, NCR-MT is OFF and NCR-Fwd is OFF. In repeater mode 3, NCR-MT is ON and NCR-Fwd is OFF. In repeater mode 4, NCR-MT is OFF and NCR-Fwd is OFF. When NCR-MT is ON, the NCR 430 may be in an uplink (UL) transmission (TX) mode, a downlink (DL) reception (RX) mode, or a full-duplex mode. When NCR-Fwd is ON, the NCR 430 may be in DL forwarding, UL forwarding, or bidirectional (DL & UL) forwarding. When NCR-MT is OFF, the NCR 430 may not transmit or receive communications. NCR-MT may be in different sleep modes (such as micro, light, and deep) associated with different power consumption values and transition times (different sleep modes may be associated with which components of MT are OFF). When NCR-Fwd is OFF, the NCR 430 does not forward any communications. The NCR-Fwd may be in different sleep modes associated with different power consumption levels and transition times.

According to various aspects described herein, the NCR 430 may operate in consideration of a minimum latency for switching between repeater modes. The minimum latency may be preconfigured via RRC signaling, specified in stored configuration information, and/or indicated to a network entity.

In some aspects, the NCR 430 may transmit an indication of a latency capability (e.g., a minimum latency to be able to switch repeater modes) to a network entity (e.g., network entity 410) via uplink control information (UCI), a medium access control control element (MAC CE), an RRC message, or operations, administration, and maintenance (OAM) signaling. The indication may be included in a capability report or associated with guard symbols used for IAB systems. The latency capability of the NCR 430 may be updated or adjusted.

In some aspects, the latency indicated in a latency capability may be based at least in part on the state of NCR-MT/NCR-Fwd when the components are ON (e.g., TX, RX, TX and RX, UL forwarding, DL forwarding, bidirectional forwarding). The latency may be based at least in part on the NCR-MT's CC(s) and/or passbands over which NCR-Fwd is operating. The latency may be based at least in part on the NCR-MT's and/or NCR-Fwd's beamforming configuration. The latency may be based at least in part on the power configuration of NCR-MT and/or NCR-Fwd, where the power configuration can be related to NCR-MT's TX and/or RX power (or phase spectral density (PSD)), NCR-Fwd's RX power, NCR-Fwd's TX power or amplification gain, and/or the relative power offset between NCR-MT's and NCR-Fwd's powers.

The latency may be based at least in part on (and be indicated or be associated with) different time resources. The latency may be based at least in part on underlying slot or resource configurations, such DL, UL, flexible, full-duplex, HARD, SOFT, or unavailable. The latency of switching between two repeater modes may not be symmetric.

In an example, the NCR 430 may not support simultaneous UL TX by NCR-MT and NCR-Fwd, or NCR-MT transmitting UL and NCR-Fwd forwarding UL. The two signals may be time division multiplexed (TDMed). Two associated modes for TDM may include a first sub-mode (Mode i) for MT transmitting UL and NCR-Fwd OFF and a second sub-mode (Mode j) for MT OFF and NCR-Fwd forwarding UL. However, switching between the two modes may require a minimum latency that may be due to expected changes in the TX power setting, expected changes in the analog filter setting, or an internal delay of NCR-Fwd. In some aspects, the NCR-Fwd may start forwarding UL before the UL TX reference, to accommodate an internal delay.

There may be an issue related to internal delay when switching from Mode i to Mode j because, without any guard symbol, the NCR-Fwd may start a forwarding window while NCR-MT is still active and finishing UL TX.

By using and/or indicating a minimum latency, the NCR 430 may be able to handle any repeater mode switches so as to not lose any communications. Avoiding lost communications conserves power, processing resources, and signaling resources.

As indicated above, FIG. 4 is provided as an example. Other examples may differ from what is described with regard to FIG. 4.

Figure 5:
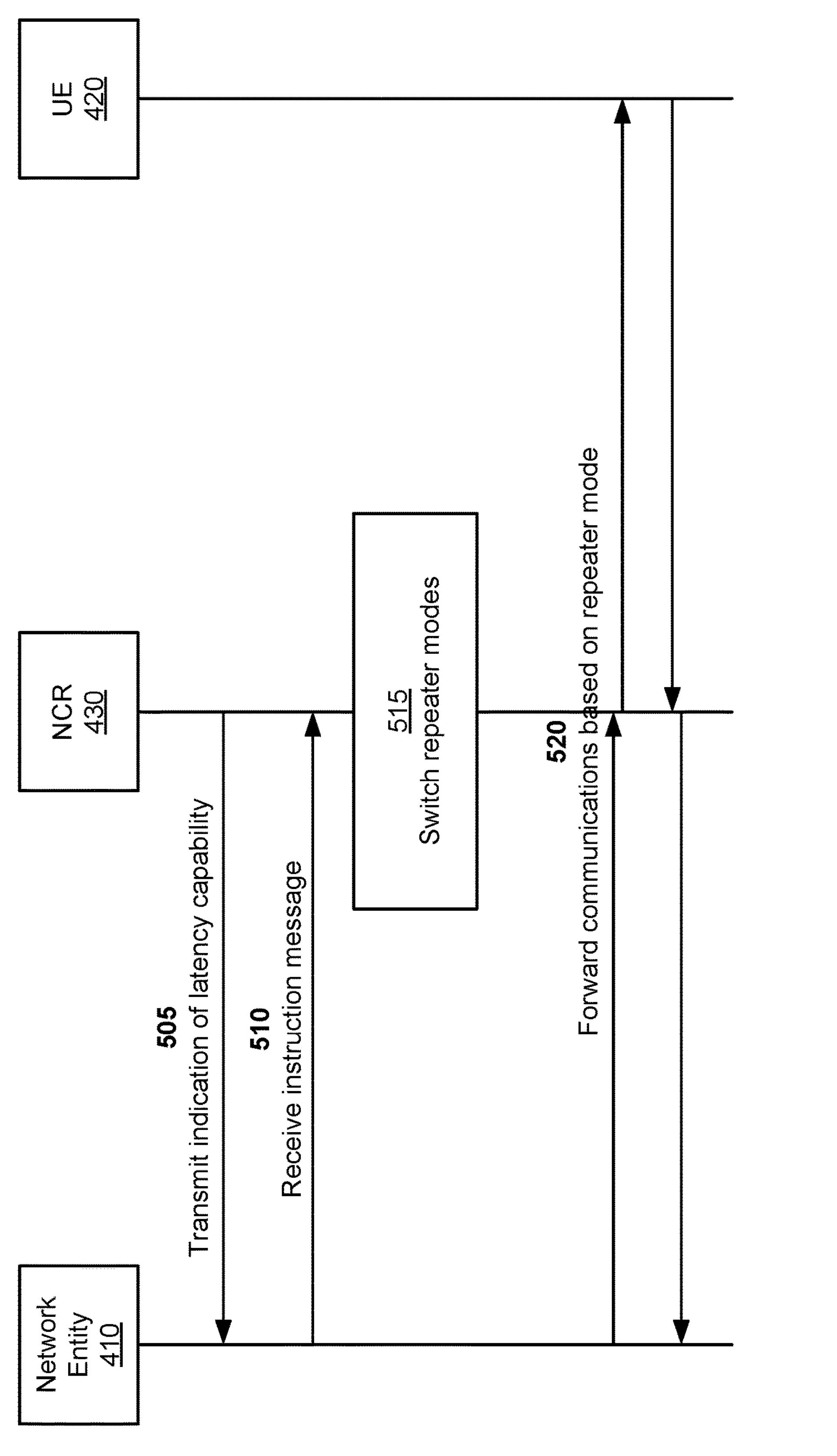
FIG. 5 is a diagram illustrating an example associated with using a latency for switching repeater modes, in accordance with the present disclosure.

FIG. 5 is a diagram illustrating an example 500 associated with using a latency for switching repeater modes, in accordance with the present disclosure.

As shown by reference number 505, the NCR 430 may transmit an indication of a latency capability. This may include an indication of a minimum latency for switching repeater modes. The minimum latency may be direction-specific for NCR-MT or for NCR-Fwd. The minimum latency may be based at least in part on direction-specific transmit powers for NCR-MT or for NCR-Fwd. The minimum latency may be specific to a time resource, such as a slot in a slot configuration. There may be a first minimum latency for switching from a first repeater mode to a second repeater mode and a second (different) minimum latency for switching from the second repeater mode to a third repeater mode or back to the first repeater mode.

As shown by reference number 510, the NCR 430 may receive an instruction message that is associated with the latency capability. For example, the NCR 430 may be instructed to switch repeater modes according to a timeline that is no shorter than the minimum latency indicated by the latency capability.

As shown by reference number 515, the NCR 430 may switch repeater modes based at least in part on the latency capability. For example, the NCR 430 may switch from a first repeater mode to a second repeater mode based at least in part on the minimum latency.

The NCR 430 may communicate with the network entity 410 and the UE 420 based at least in part on the latency capability. This may include communicating based at least in part on repeater modes and/or minimum latencies for switching between the repeater modes. As shown by reference number 520, the NCR 430 may forward communications based at least in part on the repeater mode. For example, the NCR 430 may forward communications if the repeater mode includes a repeater mode in which NCR-Fwd is ON.

In some aspects, while NCR-MT is receiving and decoding the side control information (e.g., sent via downlink control information (DCI)), NCR-Fwd may start ramping up to reduce the overall delay. For example, the NCR 430 may start forwarding (e.g., ramp up NCR-Fwd) communications a little earlier based at least in part on the latency capability and an internal delay of the NCR 430. In some aspects, the NCR 430 may start forwarding while receiving and decoding control information for the NCR-MT. The NCR 430 may use time domain duplexing information to determine the potential direction over which NCR-Fwd is expected to be fully active and forwarding. In some aspects, the NCR 430 may start forwarding based at least in part on a control message. For example, the NCR 430 may start forwarding based at least in part on a received power (e.g., RSRP) on resources over which a side control is being monitored satisfying a power threshold (e.g., meets minimum RSRP). The NCR 430 may start forwarding further based at least in part on DL DMRS detection. The indication by the NCR 430 may indicate a capability for starting forwarding early based at least in part on a received power threshold and/or DMRS detection. The NCR 430 may also receive an indication regarding whether the NCR 430 is allowed to start forwarding early. In some aspects, the NCR 430 may receive configuration information that indicates one or more of resources (e.g., time, frequency, spatial), restrictions, or conditions (e.g., thresholds) for starting forwarding early.

In some aspects, the NCR 430 may indicate a preferred time offset (e.g., minimum k0 or kx) between a physical downlink control channel (PDCCH) communication and a physical downlink shared channel (PDSCH) communication and/or a preferred time offset (e.g., minimum k2 or kx) between an uplink grant (in a PDCCH) and a physical uplink shared channel (PUSCH) communication that are supported by the NCR 430. The preferred time offsets may be associated with a latency between side control information (e.g., transmitted via DCI in a PDCCH communication) and NCR-Fwd operation (starting forwarding scheduled by the side control information). The instruction message from the network entity 410 may be based at least in part on one or more of the preferred offsets. In some aspects, the NCR 430 may receive a minimum offset indication that indicates a minimum offset between a PDCCH communication and starting forwarding. That is, the network entity 410 may notify or guarantee the NCR 430 that there will be at least some minimum offset between the PDCCH communication and the time of the NCR-Fwd operation. The actual offset may be indicated in the PDCCH communication, and the actual offset may be equal to or greater in length than the indicated minimum offset.

In some aspects, the indication may indicate a sleep mode capability for using sleep modes (e.g., deep, mini, micro) that are associated with repeater modes. The sleeps modes may be considered sub-modes for each repeater mode. The NCR 430 communication may include switching from a first repeater mode to a second repeater mode based at least in part on a first sleep mode associated with the first repeater mode and/or a second sleep mode associated with the second repeater mode.

As indicated above, FIG. 5 is provided as an example. Other examples may differ from what is described with regard to FIG. 5.

Figure 6:
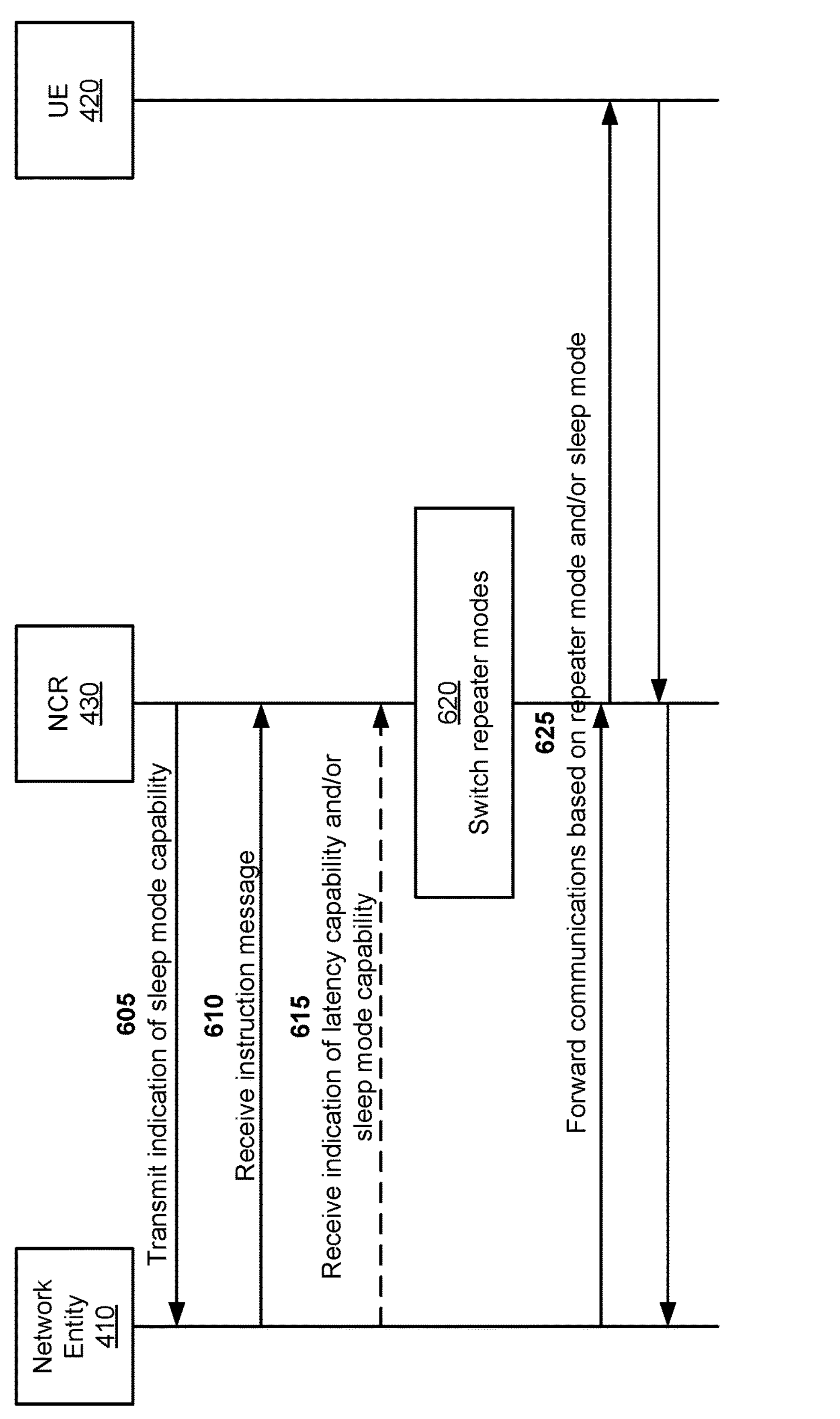
FIG. 6 is a diagram of an example of an NCR using sleep modes, in accordance with the present disclosure.

FIG. 6 is a diagram of an example 600 of an NCR using sleep modes, in accordance with the present disclosure.

In some aspects, the NCR 430 may support different sleep modes for NCR-MT and/or NCR-Fwd. The sleep modes may be used in combination with a minimum latency or other latency capability aspects. The supported sleep modes and associated information may be preconfigured via RRC signaling, specified in stored configuration information, and/or indicated by a network entity. The associated information may include a level (e.g., relative level) of power consumption and/or minimum sleep-to-wake transition time across different sleep and active modes. As shown by reference number 605, the NCR 430 may indicate a sleep mode capability for using sleep modes in association with repeater modes.

In some aspects, the sleep modes (or at least some of the sleep modes, such as micro sleep) may be configured separately for each component, or jointly for NCR-MT and NCR-Fwd such that a sleep mode is common for both NCR-MT and NCR-MT. The NCR 430 may indicate transition and/or switching times between different active and sleep states of NCR-MT and NCR-Fwd (e.g., NCR-MT micro sleep to NCR-Fwd light sleep). The NCR 430 may also indicate a total (e.g., relative) power consumption for pairs of NCR-MT and NCR-Fwd states. Information about the power consumption and transition times can assist the network entity 410 with scheduling communications and resource allocation. This information may allow the network entity 410 to implement algorithms to reduce the overall power consumption of the NCR 430 (along with other network entities). In some aspects, the NCR 430 may transmit state information that indicates a current repeater mode of the NCR and a sleep mode associated with the current repeater mode.

As shown by reference number 610, the NCR 430 may receive an instruction to use one or more sleep modes with specific repeater modes, such as sub-modes of the specific repeater modes. In some aspects, the network entity 410 may transmit an indication of a latency capability and/or a sleep mode capability to the NCR 430, as shown by reference number 615. The indications and instructions between the network entity 410 and the NCR 430 may be dynamic, semi-static, or semi-persistent. Semi-static and periodic patterns may be provided.

As shown by reference number 620, the NCR 430 may switch repeater modes based at least in part on the sleep mode capability and/or a latency capability. For example, the NCR 430 may switch from a first repeater mode to a second repeater mode based at least in part on a first sleep mode associated with the first repeater mode or a second sleep mode associated with the second repeater mode. The NCR 430 may switch repeater modes further based at least in part on a minimum latency. As shown by reference number 625, the NCR 430 may forward communications based at least in part on the sleep modes used in association with repeater modes. In this way, the NCR 430 may conserve energy by sleeping and transitioning without losing communications, which results in conserving power, processing resources, and signaling resources.

In some aspects, the indication from the NCR 430 may indicate one or more of a capability of a total power consumption of the first repeater mode or a total power consumption of the second repeater mode. The NCR 430 may switch repeater modes further based at least in part on the one or more of the total power consumption of the first repeater mode or the total power consumption of the second repeater mode.

In some aspects, the network entity 410 may transmit a wake-up signal to wake up the NCR-Fwd if wake-up signals are supported. The NCR 430 may transmit an indication to the network entity 410 to the NCR-MT. This wake-up signal may be different from an ON indication and may serve the purpose of activating NCR-Fwd and possibly bringing the NCR 430 out of a deep sleep to be ready to start forwarding immediately, if needed. When sending an indication to NCR-MT to activate (or turn ON) the NCR-Fwd, the NCR 430 may accommodate two delay components. A first delay component may include DL processing for NCR-MT (e.g., the time that NCR-MT may require to receive, process, or extract information from the side control indication). The delay may be about 1 or 2 slots if indicated via DCI or about 3 to 5 milliseconds (ms) if indicated via a MAC CE. A second delay component may be a time required for the NCR-Fwd to power ON and start a forwarding operation. The NCR 430 may speed up forwarding operations such that the latency for waking up and/or switching repeater modes will be less than a sum of the first delay component and the second delay component.

As indicated above, FIG. 6 is provided as an example. Other examples may differ from what is described with regard to FIG. 6.

Figure 7:
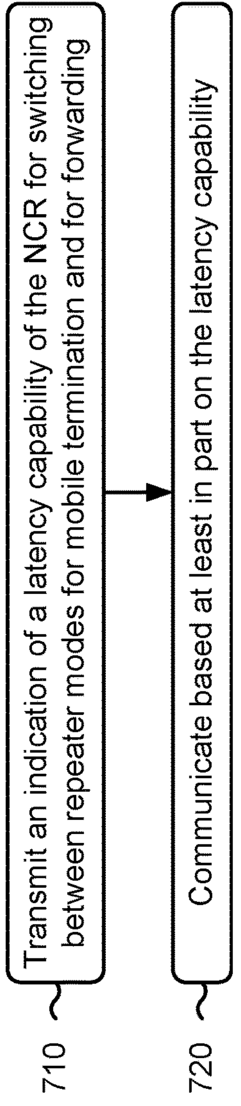
FIG. 7 is a diagram illustrating an example process performed, for example, by an NCR, in accordance with the present disclosure.

FIG. 7 is a diagram illustrating an example process 700 performed, for example, by an NCR, in accordance with the present disclosure. Example process 700 is an example where the NCR (e.g., NCR 130, NCR 430) performs operations associated with indicating a latency capability for switching NCR repeater modes.

As shown in FIG. 7, in some aspects, process 700 may include transmitting an indication of a latency capability of the NCR for switching between repeater modes for mobile termination and for forwarding (block 710). For example, the NCR (e.g., using communication manager 1108 and/or transmission component 1104 depicted in FIG. 11) may transmit an indication of a latency capability of the NCR for switching between repeater modes for mobile termination and for forwarding, as described above.

As further shown in FIG. 7, in some aspects, process 700 may include communicating based at least in part on the latency capability (block 720). For example, the NCR (e.g., using communication manager 1108, reception component 1102, and/or transmission component 1104 depicted in FIG. 11) may communicate based at least in part on the latency capability, as described above.

Process 700 may include additional aspects, such as any single aspect or any combination of aspects described below and/or in connection with one or more other processes described elsewhere herein.

In a first aspect, process 700 includes receiving an instruction message that is associated with the latency capability and switching from a first repeater mode to a second repeater mode based at least in part on the instruction message.

In a second aspect, alone or in combination with the first aspect, the indication indicates a minimum latency for switching between a first repeater mode and a second repeater mode.

In a third aspect, alone or in combination with one or more of the first and second aspects, the indication is included in a capability report.

In a fourth aspect, alone or in combination with one or more of the first through third aspects, the indication is associated with preferred guard symbols.

In a fifth aspect, alone or in combination with one or more of the first through fourth aspects, the indication indicates a latency that is based at least in part on one or more of a direction of MT or a forwarding direction.

In a sixth aspect, alone or in combination with one or more of the first through fifth aspects, the indication indicates a latency that is based at least in part on one or more of MT component carriers or forwarding passbands.

In a seventh aspect, alone or in combination with one or more of the first through sixth aspects, the indication indicates a latency that is based at least in part on one or more of a direction-specific transmit power for MT or a direction-specific transmit power for forwarding.

In an eighth aspect, alone or in combination with one or more of the first through seventh aspects, the indication indicates a latency that is specific to a time resource.

In a ninth aspect, alone or in combination with one or more of the first through eighth aspects, the indication indicates a latency that is based at least in part on a slot or time resource configuration.

In a tenth aspect, alone or in combination with one or more of the first through ninth aspects, the indication indicates a first latency for switching between a first repeater mode and a second repeater mode and a second latency for switching between the second repeater mode and a third repeater mode, and the first latency is different than the second latency.

In an eleventh aspect, alone or in combination with one or more of the first through tenth aspects, process 700 includes starting forwarding based at least in part on the latency capability and an internal delay of the NCR.

In a twelfth aspect, alone or in combination with one or more of the first through eleventh aspects, the indication indicates a sleep mode capability for using sleep modes that are associated with repeater modes.

In a thirteenth aspect, alone or in combination with one or more of the first through twelfth aspects, the communicating includes switching from a first repeater mode to a second repeater mode based at least in part on one or more of a first sleep mode associated with the first repeater mode or a second sleep mode associated with the second repeater mode.

In a fourteenth aspect, alone or in combination with one or more of the first through thirteenth aspects, process 700 includes starting forwarding while receiving and decoding control information for mobile termination.

In a fifteenth aspect, alone or in combination with one or more of the first through fourteenth aspects, the starting forwarding includes starting forwarding based at least in part on one or more of a received power threshold or DMRS detection.

In a sixteenth aspect, alone or in combination with one or more of the first through fifteenth aspects, the indication indicates a capability for starting forwarding based at least in part on a received power threshold or DMRS detection.

In a seventeenth aspect, alone or in combination with one or more of the first through sixteenth aspects, process 700 includes receiving configuration information that indicates one or more of resources, restrictions, or conditions for starting forwarding.

In an eighteenth aspect, alone or in combination with one or more of the first through seventeenth aspects, the indication indicates a preferred time offset between receiving a control message in a PDCCH communication and starting forwarding.

In a nineteenth aspect, alone or in combination with one or more of the first through eighteenth aspects, process 700 includes receiving a minimum offset indication that indicates a minimum offset between receiving a control message in a PDCCH communication and starting forwarding.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
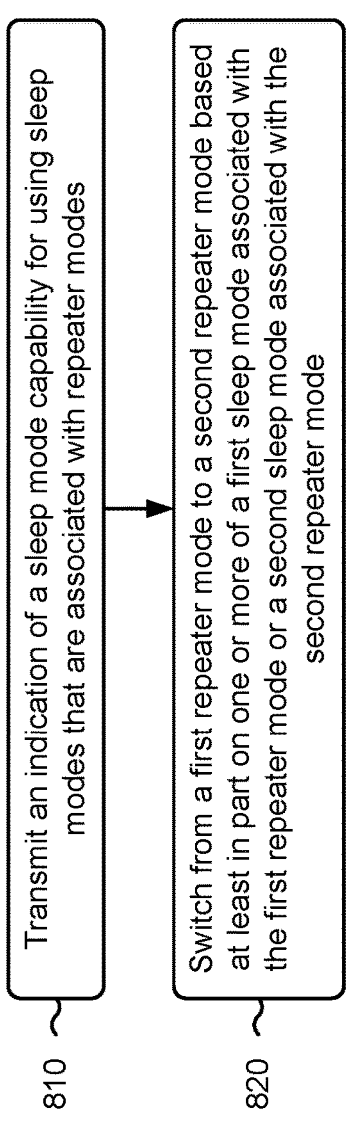
FIG. 8 is a diagram illustrating an example process performed, for example, by an NCR, in accordance with the present disclosure.

FIG. 8 is a diagram illustrating an example process 800 performed, for example, by an NCR, in accordance with the present disclosure. Example process 800 is an example where the NCR (e.g., NCR 130, NCR 430) performs operations associated with indicating a sleep mode capability for NCR repeater modes.

As shown in FIG. 8, in some aspects, process 800 may include transmitting an indication of a sleep mode capability for using sleep modes that are associated with repeater modes (block 810). For example, the NCR (e.g., using communication manager 1108 and/or transmission component 1104 depicted in FIG. 11) may transmit an indication of a sleep mode capability for using sleep modes that are associated with repeater modes, as described above.

As further shown in FIG. 8, in some aspects, process 800 may include switching from a first repeater mode to a second repeater mode based at least in part on one or more of a first sleep mode associated with the first repeater mode or a second sleep mode associated with the second repeater mode (block 820). For example, the NCR (e.g., using communication manager 1108 and/or switching component 1110 depicted in FIG. 11) may switch from a first repeater mode to a second repeater mode based at least in part on one or more of a first sleep mode associated with the first repeater mode or a second sleep mode associated with the second repeater mode, as described above.

Process 800 may include additional aspects, such as any single aspect or any combination of aspects described below and/or in connection with one or more other processes described elsewhere herein.

In a first aspect, the indication indicates one or more of a capability of a total power consumption of the first repeater mode or a total power consumption of the second repeater mode.

In a second aspect, alone or in combination with the first aspect, the switching includes switching further based at least in part on the one or more of the total power consumption of the first repeater mode or the total power consumption of the second repeater mode.

In a third aspect, alone or in combination with one or more of the first and second aspects, process 800 includes receiving a sleep mode indication that indicates a sleep mode to use for a repeater mode.

In a fourth aspect, alone or in combination with one or more of the first through third aspects, process 800 includes transmitting state information that indicates a current repeater mode of the NCR and a sleep mode associated with the current repeater mode.

In a fifth aspect, alone or in combination with one or more of the first through fourth aspects, process 800 includes receiving a wake-up signal for waking up from a sleep mode used in associated with a repeater mode.

In a sixth aspect, alone or in combination with one or more of the first through fifth aspects, the wake-up signal is based at least in part on one or more of a processing delay, an application delay, or a power up delay.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
FIG. 9 is a diagram illustrating an example process performed, for example, by a network entity, in accordance with the present disclosure.

FIG. 9 is a diagram illustrating an example process 900 performed, for example, by a network entity, in accordance with the present disclosure. Example process 900 is an example where the network entity (e.g., network node 110, network entity 410) performs operations associated with using a latency capability and/or a sleep mode capability for controlling an NCR.

As shown in FIG. 9, in some aspects, process 900 may include receiving an indication of a latency capability of an NCR for switching between repeater modes for mobile termination and for forwarding (block 910). For example, the network entity (e.g., using communication manager 1208 and/or reception component 1202 depicted in FIG. 12) may receive an indication of a latency capability of an NCR for switching between repeater modes for mobile termination and for forwarding, as described above.

As further shown in FIG. 9, in some aspects, process 900 may include communicating based at least in part on the latency capability (block 920). For example, the network entity (e.g., using communication manager 1208, reception component 1202, and/or transmission component 1204 depicted in FIG. 12) may communicate based at least in part on the latency capability, as described above.

Process 900 may include additional aspects, such as any single aspect or any combination of aspects described below and/or in connection with one or more other processes described elsewhere herein.

In a first aspect, process 900 includes transmitting an instruction message that is associated with the latency capability.

In a second aspect, alone or in combination with the first aspect, the indication indicates a minimum latency for switching between a first repeater mode and a second repeater mode.

In a third aspect, alone or in combination with one or more of the first and second aspects, the indication indicates a latency that is based at least in part on one or more of a direction-specific transmit power for MT or a direction-specific transmit power for forwarding.

In a fourth aspect, alone or in combination with one or more of the first through third aspects, the indication indicates a latency that is specific to a time resource.

In a fifth aspect, alone or in combination with one or more of the first through fourth aspects, the indication indicates a latency that is based at least in part on a slot or time resource configuration.

In a sixth aspect, alone or in combination with one or more of the first through fifth aspects, the indication indicates a first latency for switching between a first repeater mode and a second repeater mode and a second latency for switching between the second repeater mode and a third repeater mode, and the first latency is different than the second latency.

In a seventh aspect, alone or in combination with one or more of the first through sixth aspects, the indication indicates a sleep mode capability for using sleep modes that are associated with repeater modes.

In an eighth aspect, alone or in combination with one or more of the first through seventh aspects, the indication indicates a capability for starting forwarding based at least in part on a received power threshold or DMRS detection.

In a ninth aspect, alone or in combination with one or more of the first through eighth aspects, process 900 includes transmitting configuration information that indicates one or more of resources, restrictions, conditions for starting forwarding, or a minimum offset indication that indicates a minimum offset between receiving a control message in a PDCCH communication and starting forwarding.

In a tenth aspect, alone or in combination with one or more of the first through ninth aspects, the indication indicates a preferred time offset between receiving a control message in a PDCCH communication and starting forwarding.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
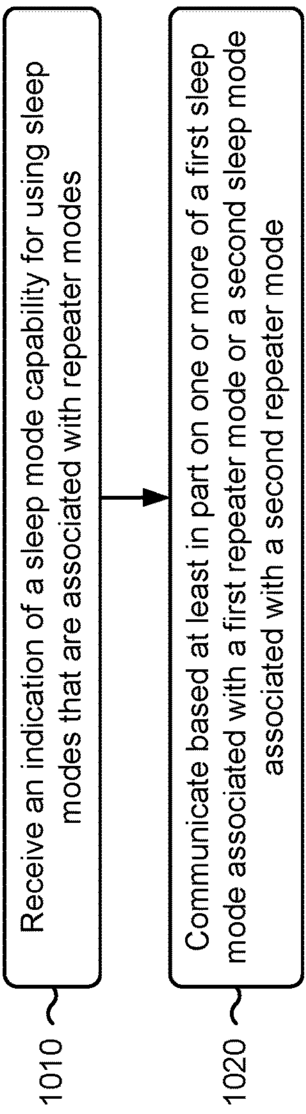
FIG. 10 is a diagram illustrating an example process performed, for example, by an NCR, in accordance with the present disclosure.

FIG. 10 is a diagram illustrating an example process 1000 performed, for example, by an NCR, in accordance with the present disclosure. Example process 1000 is an example where the NCR (e.g., NCR 130, NCR 430) performs operations associated with receiving an indication of a sleep mode capability.

As shown in FIG. 10, in some aspects, process 1000 may include receiving an indication of a sleep mode capability for using sleep modes that are associated with repeater modes (block 1010). For example, the NCR (e.g., using communication manager 1108 and/or reception component 1102 depicted in FIG. 11) may receive an indication of a sleep mode capability for using sleep modes that are associated with repeater modes, as described above.

As further shown in FIG. 10, in some aspects, process 1000 may include communicating based at least in part on one or more of a first sleep mode associated with a first repeater mode or a second sleep mode associated with a second repeater mode (block 1020). For example, the NCR (e.g., using communication manager 1108, reception component 1102, and/or transmission component 1104 depicted in FIG. 11) may communicate based at least in part on one or more of a first sleep mode associated with a first repeater mode or a second sleep mode associated with a second repeater mode, as described above.

Process 1000 may include additional aspects, such as any single aspect or any combination of aspects described below and/or in connection with one or more other processes described elsewhere herein.

In a first aspect, the indication indicates one or more of a capability of a total power consumption of the first repeater mode or a total power consumption of the second repeater mode.

In a second aspect, alone or in combination with the first aspect, process 1000 includes transmitting a sleep mode indication that indicates a sleep mode to use for a repeater mode.

In a third aspect, alone or in combination with one or more of the first and second aspects, process 1000 includes receiving state information that indicates a current repeater mode of the NCR and a sleep mode associated with the current repeater mode.

In a fourth aspect, alone or in combination with one or more of the first through third aspects, process 1000 includes transmitting a wake-up signal for waking up from a sleep mode used in association with a repeater mode.

In a fifth aspect, alone or in combination with one or more of the first through fourth aspects, the wake-up signal is based at least in part on one or more of a processing delay, an application delay, or a power up delay.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
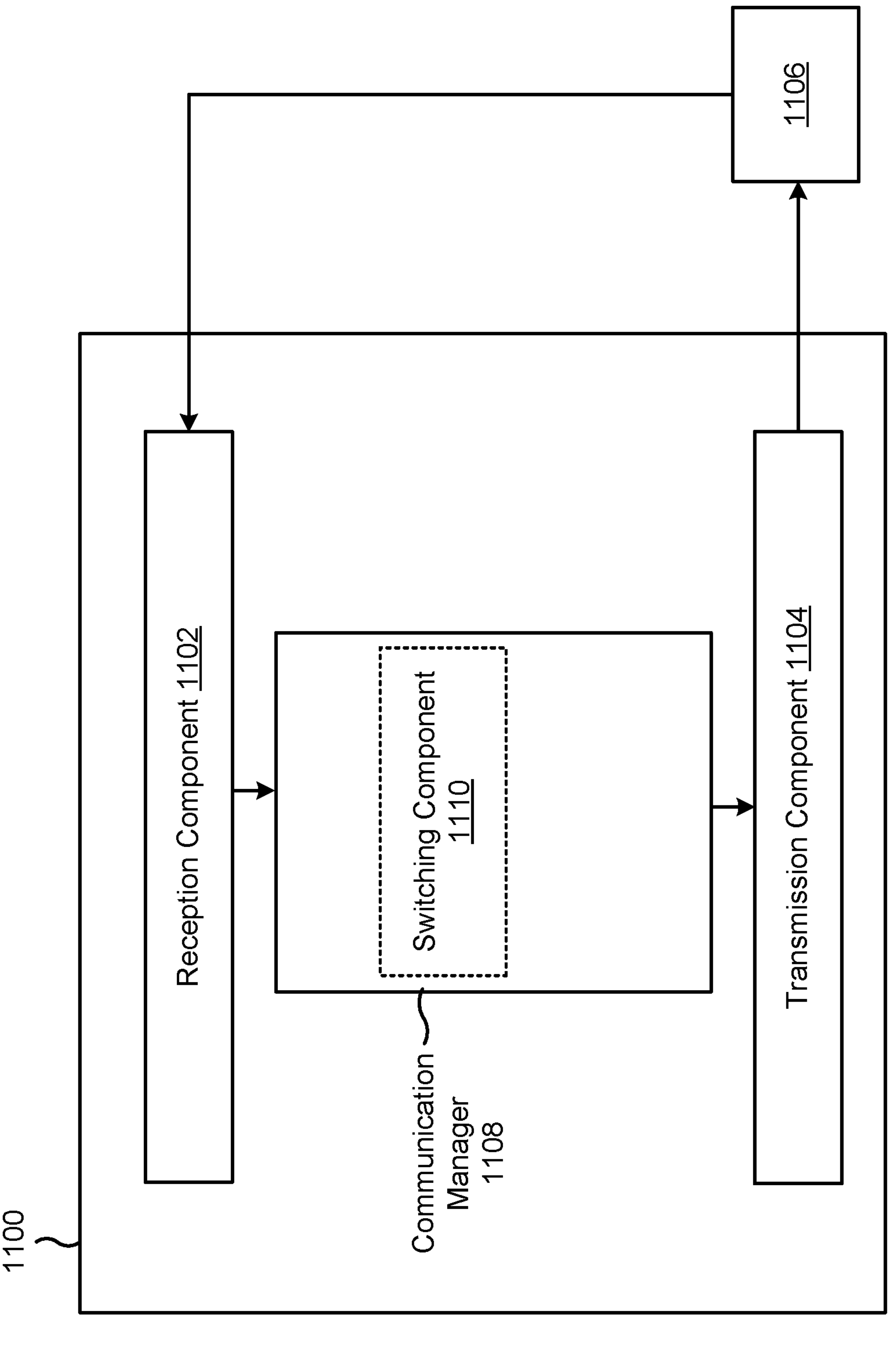
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be an NCR (e.g., NCR 130, NCR 430), or an NCR may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may control and/or otherwise manage one or more operations of the reception component 1102 and/or the transmission component 1104. In some aspects, the communication manager 1108 may include one or more antennas, a modem, a controller/processor, a memory, or a combination thereof, of the NCR described in connection with FIG. 2. The communication manager 1108 may be, or be similar to, the communication manager 160 depicted in FIGS. 1 and 2. For example, in some aspects, the communication manager 1108 may be configured to perform one or more of the functions described as being performed by the communication manager 160. In some aspects, the communication manager 1108 may include the reception component 1102 and/or the transmission component 1104. The communication manager 1108 may include a switching component 1110, among other examples.

In some aspects, the apparatus 1100 may be configured to perform one or more operations described herein in connection with FIGS. 1-6. Additionally, or alternatively, the apparatus 1100 may be configured to perform one or more processes described herein, such as process 700 of FIG. 7, process 800 of FIG. 8, process 1000 of FIG. 10, or a combination thereof. In some aspects, the apparatus 1100 and/or one or more components shown in FIG. 11 may include one or more components of the NCR described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the NCR described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the NCR described in connection with FIG. 2. In some aspects, the transmission component 1104 may be co-located with the reception component 1102 in a transceiver.

In some aspects, the transmission component 1104 may transmit an indication of a latency capability of the NCR for switching between repeater modes for mobile termination and for forwarding. The transmission component 1104 and the reception component 1102 may communicate based at least in part on the latency capability.

The reception component 1102 may receive an instruction message that is associated with the latency capability. The switching component 1110 may switch from a first repeater mode to a second repeater mode based at least in part on the instruction message.

The transmission component 1104 may start forwarding based at least in part on the latency capability and an internal delay of the NCR. The transmission component 1104 may start forwarding while receiving and decoding control information for mobile termination. The reception component 1102 may receive configuration information that indicates one or more of resources, restrictions, or conditions for starting forwarding.

In some aspects, the transmission component 1104 may transmit an indication of a sleep mode capability for using sleep modes that are associated with repeater modes. The switching component 1110 may switch from a first repeater mode to a second repeater mode based at least in part on one or more of a first sleep mode associated with the first repeater mode or a second sleep mode associated with the second repeater mode.

The reception component 1102 may receive a sleep mode indication that indicates a sleep mode to use for a repeater mode. The transmission component 1104 may transmit state information that indicates a current repeater mode of the NCR and a sleep mode associated with the current repeater mode. The reception component 1102 may receive a wake-up signal for waking up from a sleep mode used in association with a repeater mode.

In some aspects, the reception component 1102 may receive an indication of a sleep mode capability for using sleep modes that are associated with repeater modes. The transmission component 1104 and the reception component 1102 may communicate based at least in part on one or more of a first sleep mode associated with a first repeater mode or a second sleep mode associated with a second repeater mode.

The transmission component 1104 may transmit a sleep mode indication that indicates a sleep mode to use for a repeater mode. The reception component 1102 may receive state information that indicates a current repeater mode of the NCR and a sleep mode associated with the current repeater mode. The transmission component 1104 may transmit a wake-up signal for waking up from a sleep mode used in association with a repeater mode.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
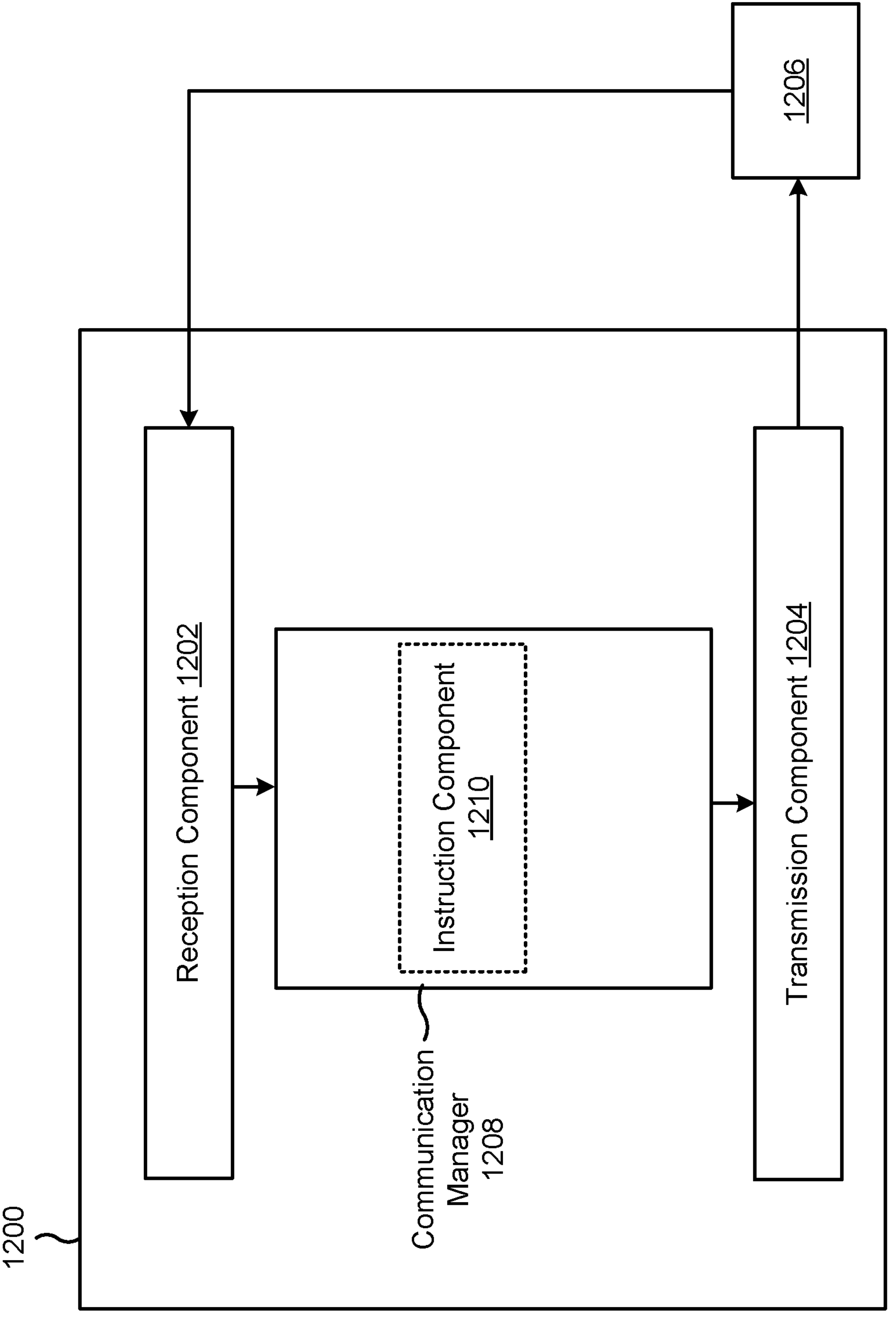
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network entity (e.g., network node 110, network entity 410), or a network entity may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the network entity described in connection with FIG. 2. The communication manager 1208 may be, or be similar to, the communication manager 150 depicted in FIGS. 1 and 2. For example, in some aspects, the communication manager 1208 may be configured to perform one or more of the functions described as being performed by the communication manager 150. In some aspects, the communication manager 1208 may include the reception component 1202 and/or the transmission component 1204. The communication manager 1208 may include an instruction component 1210, among other examples.

In some aspects, the apparatus 1200 may be configured to perform one or more operations described herein in connection with FIGS. 1-7. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the network entity described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network entity described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network entity described in connection with FIG. 2. In some aspects, the transmission component 1204 may be co-located with the reception component 1202 in a transceiver.

The reception component 1202 may receive an indication of a latency capability of an NCR for switching between repeater modes for mobile termination and for forwarding. The instruction component 1210 may instruct the NCR to use a latency for switching repeater modes and/or to use a sleep mode for a repeater mode based at least in part on NCR capabilities, UE capabilities, traffic conditions, and/or channel conditions. The transmission component 1204 and the reception component 1202 may communicate based at least in part on the latency capability.

The transmission component 1204 may transmit an instruction message that is associated with the latency capability. The transmission component 1204 may transmit configuration information that indicates one or more of resources, restrictions, or conditions for starting forwarding.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network-controlled repeater (NCR), comprising: transmitting an indication of a latency capability of the NCR for switching between repeater modes for mobile termination and for forwarding; and communicating based at least in part on the latency capability.

Aspect 2: The method of Aspect 1, further comprising: receiving an instruction message that is associated with the latency capability; and switching from a first repeater mode to a second repeater mode based at least in part on the instruction message.

Aspect 3: The method of any of Aspects 1-2, wherein the indication indicates a minimum latency for switching between a first repeater mode and a second repeater mode.

Aspect 4: The method of any of Aspects 1-3, wherein the indication is included in a capability report.

Aspect 5: The method of any of Aspects 1-4, wherein the indication is associated with preferred guard symbols.

Aspect 6: The method of any of Aspects 1-5, wherein the indication indicates a latency that is based at least in part on one or more of a direction of mobile termination or a forwarding direction.

Aspect 7: The method of any of Aspects 1-6, wherein the indication indicates a latency that is based at least in part on one or more of mobile termination component carriers or forwarding passbands.

Aspect 8: The method of any of Aspects 1-7, wherein the indication indicates a latency that is based at least in part on one or more of a direction-specific transmit power for mobile termination or a direction-specific transmit power for forwarding.

Aspect 9: The method of any of Aspects 1-8, wherein the indication indicates a latency that is specific to a time resource.

Aspect 10: The method of any of Aspects 1-9, wherein the indication indicates a latency that is based at least in part on a slot or time resource configuration.

Aspect 11: The method of any of Aspects 1-10, wherein the indication indicates a first latency for switching between a first repeater mode and a second repeater mode and a second latency for switching between the second repeater mode and a third repeater mode, and wherein the first latency is different than the second latency.

Aspect 12: The method of any of Aspects 1-11, further comprising starting forwarding based at least in part on the latency capability and an internal delay of the NCR.

Aspect 13: The method of any of Aspects 1-12, wherein the indication indicates a sleep mode capability for using sleep modes that are associated with repeater modes.

Aspect 14: The method of Aspect 13, wherein the communicating includes switching from a first repeater mode to a second repeater mode based at least in part on one or more of a first sleep mode associated with the first repeater mode or a second sleep mode associated with the second repeater mode.

Aspect 15: The method of any of Aspects 1-14, further comprising starting forwarding while receiving and decoding control information for mobile termination.

Aspect 16: The method of Aspect 15, wherein the starting forwarding includes starting forwarding based at least in part on one or more of a received power threshold or demodulation reference signal (DMRS) detection.

Aspect 17: The method of Aspect 16, wherein the indication indicates a capability for starting forwarding based at least in part on a received power threshold or DMRS detection.

Aspect 18: The method of any of Aspects 1-17, further comprising receiving configuration information that indicates one or more of resources, restrictions, or conditions for starting forwarding.

Aspect 19: The method of any of Aspects 1-18, wherein the indication indicates a preferred time offset between receiving a control message in a physical downlink control channel communication and starting forwarding.

Aspect 20: The method of any of Aspects 1-19, further comprising receiving a minimum offset indication that indicates a minimum offset between receiving a control message in a physical downlink control channel communication and starting forwarding.

Aspect 21: A method of wireless communication performed by a network-controlled repeater (NCR), comprising: transmitting an indication of a sleep mode capability for using sleep modes that are associated with repeater modes; and switching from a first repeater mode to a second repeater mode based at least in part on one or more of a first sleep mode associated with the first repeater mode or a second sleep mode associated with the second repeater mode.

Aspect 22: The method of Aspect 21, wherein the indication indicates one or more of a capability of a total power consumption of the first repeater mode or a total power consumption of the second repeater mode.

Aspect 23: The method of Aspect 22, wherein the switching includes switching further based at least in part on the one or more of the total power consumption of the first repeater mode or the total power consumption of the second repeater mode.

Aspect 24: The method of any of Aspects 21-23, further comprising receiving a sleep mode indication that indicates a sleep mode to use for a repeater mode.

Aspect 25: The method of any of Aspects 21-24, further comprising transmitting state information that indicates a current repeater mode of the NCR and a sleep mode associated with the current repeater mode.

Aspect 26: The method of any of Aspects 21-25, further comprising receiving a wake-up signal for waking up from a sleep mode used in association with a repeater mode.

Aspect 27: The method of Aspect 26, wherein the wake-up signal is based at least in part on one or more of a processing delay, an application delay, or a power up delay.

Aspect 28: A method of wireless communication performed by a network entity, comprising: receiving an indication of a latency capability of a network-controlled repeater (NCR) for switching between repeater modes for mobile termination and for forwarding; and communicating based at least in part on the latency capability.

Aspect 29: The method of Aspect 28, further comprising transmitting an instruction message that is associated with the latency capability.

Aspect 30: The method of any of Aspects 28-29, wherein the indication indicates a minimum latency for switching between a first repeater mode and a second repeater mode.

Aspect 31: The method of any of Aspects 28-30, wherein the indication indicates a latency that is based at least in part on one or more of a direction-specific transmit power for mobile termination or a direction-specific transmit power for forwarding.

Aspect 32: The method of any of Aspects 28-31, wherein the indication indicates a latency that is specific to a time resource.

Aspect 33: The method of any of Aspects 28-32, wherein the indication indicates a latency that is based at least in part on a slot or time resource configuration.

Aspect 34: The method of any of Aspects 28-33, wherein the indication indicates a first latency for switching between a first repeater mode and a second repeater mode and a second latency for switching between the second repeater mode and a third repeater mode, and wherein the first latency is different than the second latency.

Aspect 35: The method of any of Aspects 28-34, wherein the indication indicates a sleep mode capability for using sleep modes that are associated with repeater modes.

Aspect 36: The method of any of Aspects 28-35, wherein the indication indicates a capability for starting forwarding based at least in part on a received power threshold or DMRS detection.

Aspect 37: The method of any of Aspects 28-36, further comprising transmitting configuration information that indicates one or more of resources, restrictions, conditions for starting forwarding, or a minimum offset indication that indicates a minimum offset between receiving a control message in a physical downlink control channel communication and starting forwarding.

Aspect 38: The method of any of Aspects 28-37, wherein the indication indicates a preferred time offset between receiving a control message in a physical downlink control channel communication and starting forwarding.

Aspect 39: A method of wireless communication performed by a network-controlled repeater (NCR), comprising: receiving an indication of a sleep mode capability for using sleep modes that are associated with repeater modes; and communicating based at least in part on one or more of a first sleep mode associated with a first repeater mode or a second sleep mode associated with a second repeater mode.

Aspect 40: The method of Aspect 39, wherein the indication indicates one or more of a capability of a total power consumption of the first repeater mode or a total power consumption of the second repeater mode.

Aspect 41: The method of any of Aspects 39-40, further comprising transmitting a sleep mode indication that indicates a sleep mode to use for a repeater mode.

Aspect 42: The method of any of Aspects 39-41, further comprising receiving state information that indicates a current repeater mode of the NCR and a sleep mode associated with the current repeater mode.

Aspect 43: The method of Aspect 42, further comprising transmitting a wake-up signal for waking up from a sleep mode used in association with a repeater mode.

Aspect 44: The method of Aspect 43, wherein the wake-up signal is based at least in part on one or more of a processing delay, an application delay, or a power up delay.

Aspect 45: An apparatus for wireless communication at a device, comprising a processor; memory coupled with the processor; and instructions stored in the memory and executable by the processor to cause the apparatus to perform the method of one or more of Aspects 1-44.

Aspect 46: A device for wireless communication, comprising a memory and one or more processors coupled to the memory, the one or more processors configured to perform the method of one or more of Aspects 1-44.

Aspect 47: An apparatus for wireless communication, comprising at least one means for performing the method of one or more of Aspects 1-44.

Aspect 48: A non-transitory computer-readable medium storing code for wireless communication, the code comprising instructions executable by a processor to perform the method of one or more of Aspects 1-44.

Aspect 49: A non-transitory computer-readable medium storing a set of instructions for wireless communication, the set of instructions comprising one or more instructions that, when executed by one or more processors of a device, cause the device to perform the method of one or more of Aspects 1-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network-controlled repeater (NCR) for wireless communication, comprising:
- one or more memories; and
- one or more processors coupled to the one or more memories, the one or more memories storing instructions configurable to be executed by the one or more processors to cause the NCR to:
  - transmit an indication of a sleep mode capability for using sleep modes that are associated with repeater modes; and
  - switch, based at least in part on the indication of the sleep mode capability, from a first repeater mode to a second repeater mode based at least in part on one or more of a first sleep mode associated with the first repeater mode or a second sleep mode associated with the second repeater mode.

2. The NCR of claim 1, wherein the indication indicates one or more of a capability of a total power consumption of the first repeater mode or a total power consumption of the second repeater mode.

3. The NCR of claim 2, wherein the instructions configurable to be executed are further executable by the one or more processors to cause the NCR to switch further based at least in part on the one or more of the total power consumption of the first repeater mode or the total power consumption of the second repeater mode.

4. The NCR of claim 1, wherein the instructions configurable to be executed are further executable by the one or more processors to cause the NCR to transmit state information that indicates a current repeater mode of the NCR and a sleep mode associated with the current repeater mode.

5. The NCR of claim 1, wherein the instructions configurable to be executed are further executable by the one or more processors to cause the NCR to receive a wake-up signal for waking up from a sleep mode used in association with a repeater mode.

6. A network-controlled repeater (NCR) for wireless communication, comprising:
- one or more memories; and
- one or more processors coupled to the one or more memories, the one or more memories storing instructions configurable to be executed by the one or more processors to cause the NCR to:
  - receive an indication of a sleep mode capability for using sleep modes that are associated with repeater modes; and
  - communicate based at least in part on the indication of the sleep mode capability and one or more of a first sleep mode associated with a first repeater mode or a second sleep mode associated with a second repeater mode.

7. The NCR of claim 6, wherein the indication indicates one or more of a capability of a total power consumption of the first repeater mode or a total power consumption of the second repeater mode.

8. The NCR of claim 6, wherein the instructions configurable to be executed are further executable by the one or more processors to cause the NCR to transmit a sleep mode indication that indicates a sleep mode to use for a repeater mode.

9. The NCR of claim 6, wherein the instructions configurable to be executed are further executable by the one or more processors to cause the NCR to transmit a wake-up signal for waking up from a sleep mode used in association with a repeater mode, and wherein the wake-up signal is based at least in part on one or more of a processing delay, an application delay, or a power up delay.

10. A non-transitory computer-readable medium storing a set of instructions for wireless communication, the set of instructions comprising:
- one or more instructions that, when executed by one or more processors of a network-controlled repeater (NCR), cause the NCR to:
  - transmit an indication of a sleep mode capability for using sleep modes that are associated with repeater modes; and
  - switch, based at least in part on the indication of the sleep mode capability, from a first repeater mode to a second repeater mode based at least in part on one or more of a first sleep mode associated with the first repeater mode or a second sleep mode associated with the second repeater mode.

11. The non-transitory computer-readable medium of claim 10, wherein the indication indicates one or more of a capability of a total power consumption of the first repeater mode or a total power consumption of the second repeater mode.

12. The non-transitory computer-readable medium of claim 11, further comprising instructions that, when executed, cause the NCR to switch further based at least in part on the one or more of the total power consumption of the first repeater mode or the total power consumption of the second repeater mode.

13. The non-transitory computer-readable medium of claim 10, further comprising instructions that, when executed, cause the NCR to transmit state information that indicates a current repeater mode of the NCR and a sleep mode associated with the current repeater mode.

14. The non-transitory computer-readable medium of claim 10, further comprising instructions that, when executed, cause the NCR to receive a wake-up signal for waking up from a sleep mode used in association with a repeater mode.

15. A non-transitory computer-readable medium storing a set of instructions for wireless communication, the set of instructions comprising:
- one or more instructions that, when executed by one or more processors of a network-controlled repeater (NCR), cause the NCR to:
  - receive an indication of a sleep mode capability for using sleep modes that are associated with repeater modes; and
  - communicate based at least in part on the indication of the sleep mode capability and one or more of a first sleep mode associated with a first repeater mode or a second sleep mode associated with a second repeater mode.

16. The non-transitory computer-readable medium of claim 15, wherein the indication indicates one or more of a capability of a total power consumption of the first repeater mode or a total power consumption of the second repeater mode.

17. The non-transitory computer-readable medium of claim 15, further comprising instructions that, when executed, cause the NCR to transmit a sleep mode indication that indicates a sleep mode to use for a repeater mode.

18. The non-transitory computer-readable medium of claim 15, further comprising instructions that, when executed, cause the NCR to transmit a wake-up signal for waking up from a sleep mode used in association with a repeater mode, and wherein the wake-up signal is based at least in part on one or more of a processing delay, an application delay, or a power up delay.

* * * * *